(12) United States Patent
Sun et al.

(10) Patent No.: US 11,874,239 B2
(45) Date of Patent: Jan. 16, 2024

(54) ADVANCED X-RAY EMISSION SPECTROMETERS

(71) Applicant: UCHICAGO ARGONNE, LLC, Chicago, IL (US)

(72) Inventors: Chengjun Sun, Naperville, IL (US); Mikhail A. Solovyev, Western Springs, IL (US); Steve Heald, Downers Grove, IL (US); Xiaoyi Zhang, Naperville, IL (US); Maria Chan, Chicago, IL (US); Shelly D. Kelly, Bolingbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 17/692,994

(22) Filed: Mar. 11, 2022

(65) Prior Publication Data

US 2023/0288352 A1    Sep. 14, 2023

(51) Int. Cl.
*G01N 23/207* (2018.01)
*G01N 23/20008* (2018.01)
(Continued)

(52) U.S. Cl.
CPC ... *G01N 23/2076* (2013.01); *G01N 23/20008* (2013.01); *G01N 23/223* (2013.01); *G01N 23/2209* (2018.02); *G01N 2223/0568* (2013.01); *G01N 2223/076* (2013.01); *G01N 2223/1016* (2013.01); *G01N 2223/30* (2013.01); *G01N 2223/50* (2013.01)

(58) Field of Classification Search
None
See application file for complete search history.

(56) References Cited

U.S. PATENT DOCUMENTS 3,980,568 A * 9/1976 Pitchford ........... G01N 23/2076
378/54
4,987,582 A * 1/1991 Webster ............... G01N 23/223
378/49

(Continued)

FOREIGN PATENT DOCUMENTS

EP        3168606 A1 *  5/2017  ......... G01N 23/2076

OTHER PUBLICATIONS

Dickinson, et al "A short working distance multiple crystal x-ray spectrometer", arXiv, submitted Sep. 21, 2008. (Year: 2008).*

(Continued)

*Primary Examiner* — Thomas R Artman
(74) *Attorney, Agent, or Firm* — MARSHALL, GERSTEIN & BORUN LLP

(57) ABSTRACT

Spectroscopy systems require a crystal having specific properties for analyzing a spectrum of a sample, which is typically performed for measuring the presence of one element at a time. A two-dimensional (2D) crystal mount for performing simultaneous spectroscopy measurements includes a crystal holder having multiple rows of crystal mounts. Each crystal mount is positioned and orientated to physically support a crystal at a fixed position and fixed orientation relative to an optical axis. A sample provides radiation to analyzer crystals disposed in the crystal mounts, and a detector may detect radiation reflected from the analyzer crystals, for performing multiple simultaneous spectroscopy measurements.

18 Claims, 13 Drawing Sheets

(51) Int. Cl.
*G01N 23/2209* (2018.01)
*G01N 23/223* (2006.01)

(56) References Cited

U.S. PATENT DOCUMENTS

| | | | | |
|---|---|---|---|---|
| 7,555,098 | B2* | 6/2009 | Zhang | B82Y 10/00 378/85 |
| 8,058,621 | B2* | 11/2011 | Kommareddy | G01N 33/22 250/364 |
| 8,537,967 | B2* | 9/2013 | Seidler | G01N 23/2076 378/45 |
| 9,417,341 | B2* | 8/2016 | Erko | G21K 1/067 |
| 10,018,577 | B2* | 7/2018 | Koch | G01N 23/2076 |
| 2005/0201517 | A1* | 9/2005 | Chen | G21K 1/06 378/84 |
| 2008/0273663 | A1* | 11/2008 | Zhang | G01N 23/223 378/91 |
| 2011/0058652 | A1* | 3/2011 | Seidler | B82Y 10/00 250/311 |
| 2011/0095190 | A1* | 4/2011 | Kommareddy | G01N 23/207 701/100 |
| 2014/0314207 | A1* | 10/2014 | Erko | G21K 1/067 378/82 |
| 2016/0290939 | A1* | 10/2016 | Koch | G01N 23/2076 |

OTHER PUBLICATIONS

EasyXAFS LLC, product web page downloaded from the Internet at: <https://www.easyxafs.com/products>. Retrieved from Internet on Jun. 10, 2022.

Kim et al., Quartz-based flat-crystal resonant inelastic x-ray scattering spectrometer with sub-10 meV energy resolution, Scientific Reports, 8(1):1958 (2018).

Pilatus 200K: Towards the ideal detector, Product Brochure, Rigaku Corporation (Jun. 2013).

Szlachetko et al., Wavelength-dispersive spectrometer for X-ray microfluorescence analysis at the X-ray microscopy beamline ID21 (ESRF), Journal of Synchrotron Radiation, 17(3):400-408 (2010).

* cited by examiner

| Element | Kβ13 eV | Crystal | Reflection | $E_0$ eV | θ (Kβ$_{1,3}$) | θ=74.75 Energy eV | θ=71.89 Energy eV | Energy Range eV |
|---|---|---|---|---|---|---|---|---|
| | | | | | | Energy Ranges For 74.75 To 71.89 θ 0Bragg Range | | |
| Cr | 5947 | Ge | (3 3 3) | 5694 | 73.23 | 5901.82 | 5990.77 | 88.96 |
| Mn | 6490 | Ge | (0 4 4) | 6199 | 72.78 | 6425.25 | 6522.09 | 96.84 |
| Fe | 7058 | Si | (1 3 5) | 6753 | 73.09 | 6999.47 | 7104.97 | 105.50 |
| Co | 7649 | LiNbO$_3$ | (0 -1 16) | 7289 | 72.35 | 7555.03 | 7668.91 | 113.87 |
| Ni | 8265 | Si | (4 4 4) | 7908 | 73.10 | 8196.63 | 8320.17 | 123.54 |
| Cu | 8905 | Si | (2 4 6) | 8542 | 73.58 | 8853.76 | 8987.21 | 133.45 |
| Zn | 9572 | Si | (0 0 8) | 9132 | 73.44 | 9465.30 | 9607.96 | 142.67 |

FIG. 5

| Edge | Avg Total Resolution eV | Pixel Size Contribution eV | Darwin Width Contribution eV | Spot Size Contribution eV |
|---|---|---|---|---|
| Cr | 0.437 | 0.417 | 0.117 | 0.061 |
| Mn | 0.489 | 0.464 | 0.137 | 0.067 |
| Fe | 0.507 | 0.500 | 0.073 | 0.040 |
| Co | 0.573 | 0.563 | 0.069 | 0.082 |
| Ni | 0.593 | 0.585 | 0.039 | 0.085 |
| Cu | 0.623 | 0.626 | 0.032 | 0.089 |
| Zn | 0.710 | 0.702 | 0.027 | 0.102 |

ADVANCED X-RAY EMISSION SPECTROMETERS

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for performing spectrometry, and specifically to performing multiple simultaneous X-ray spectrometry measurements using a plurality of crystals.

BACKGROUND

Spectroscopic techniques may be used for characterization of materials for research, manufacturing, chemical analysis, and medical technologies, among other applications. Specifically, X-ray spectroscopy may be used for material analysis and classification for a broad range of elements, and chemical compounds. Typically, X-ray radiation is provided to a sample to excite elements and chemicals of the sample, radiation is then emitted from the sample and the spectrum of the emitted radiation is further manipulated and analyzed. X-ray spectroscopy may implement X-ray gratings, X-ray interferometers, semiconductor elements, or crystals for determining spectral content of the output radiation. For example, energy-dispersive X-ray spectroscopy utilizes a semiconductor detector for determining energy values and an overall spectrum, of the photons. Semiconductor spectrometers typically require being cooled by liquid nitrogen during operation which increases the complexity and size of such a spectrometer, and further increases required maintenance, labor, and costs of a spectrometer.

Another type of X-ray spectroscopy, known as wavelength-dispersive X-ray spectroscopy, utilizes a single crystal to diffract the output radiation of a sample, with a detector positioned to receive the diffracted photons. The relative positions of the crystal and detector may be tuned to focus different wavelengths of radiation onto the detector. Therefore, the spectroscopy measurement is performed by tuning the physical geometries of the crystal and detector. X-ray spectroscopy systems that employ crystals are limited in spectral ranges determined by the specific crystal used. Therefore, a single measurement is only useful for performing material analysis of a single element or chemical. As such, spectroscopic measurements of samples must be repeated, analyzing the presence of multiple chemicals or elements in a sample. This results in long spectroscopy measurement times, which further allows for error due to mechanical and environmental shifts over multiple measurements.

Additionally, the measurements are further slowed by the fact that the crystal and/or detector must be physically moved through a spatial range to obtain a single spectrum. As such, current X-ray spectroscopy techniques are limited to measuring a single element or chemical, require long measurement times, and can be complex due to components required for temperature control and the movement of optics and sensors.

SUMMARY OF THE DISCLOSURE

In an embodiment, disclosed is a two-dimensional (2D) diffractive element mount for performing simultaneous multi-element spectrometry. The diffractive element mount is a three-dimensional structure that has mounts for mounting thin crystals in a 2D array. The 2D diffractive element mount includes a crystal holder having a plurality of rows of crystal position mounts. Each row of crystal position mounts has a plurality of crystal mounts for supporting a crystal therein. When the 2D diffractive element mount is disposed along an optical axis, each crystal mount has a position and orientation relative to the optical axis that supports a crystal therein at a fixed position and fixed orientation relative to the optical axis. For performing spectrometry, each crystal position mount further supports crystals in a position to receive radiation from a radiation source, such as a material sample, on which spectroscopy is to be performed. Each crystal that may be disposed in the crystal position mount may be of a same material, or different material. Each row of crystals may independently have crystals of a same material.

An implementation of the current embodiment is a selectively configurable diffractive element mount having a plurality of 2D diffractive element mounts. Each 2D diffractive element mount is disposed along a circumference of a circle having a central axis of rotation. Each 2D diffractive element mount is revolvable around the central axis to revolve each 2D diffractive element mount may be positioned into an optical axis, and out of the optical axis. In a variation of the current implementation, each row of the selectively configurable diffractive element mount is revolvable into an active position relative to an optical axis to support a crystal therein at a fixed position and fixed orientation relative to the optical axis, and out of the active position.

A further implementation of the 2D diffractive element is a spectrometer having the 2D diffractive optical element mount with crystals disposed in the crystal position mounts, a source positioned to provide radiation to the crystals of the 2D diffractive element mount, and a detector disposed to receive diffracted radiation from the crystals of the 2D diffractive element mount.

In another embodiment, disclosed herein is a method for performing simultaneous multi-element spectroscopy. The method includes providing radiation to a sample disposed along a propagation axis of the radiation. The sample then fluoresces due to the provided radiation, and the sample provides the fluorescent radiation to a multiple diffractive element. The multiple diffractive element has a plurality of rows of crystals disposed to receive the fluorescent radiation. The method further includes diffracting, by the crystals, the radiation toward a detector, and receiving, at the detector, the radiation from the crystals.

BRIEF DESCRIPTION OF THE DRAWINGS

FIG. 5 is a table of information for a spectrometer system including 7 measurable elements and corresponding k□13 transition energies, crystal types, and crystal reflection vectors.

DETAILED DESCRIPTION

X-ray spectroscopy is a method that utilizes X-ray radiation for analyzing crystal lattices, atomic and molecular structures, and performing elemental and chemical analysis of materials. Wavelength-dispersive X-ray spectrometry uses dispersive materials to spatially separate wavelengths of radiation for performing spectroscopy. Commonly, crystals are used in X-ray spectroscopy systems, with a single crystal able to measure a single peak at a time. Therefore, a single measurement only measures a single element or chemical. As such, multiple measurements, using multiple crystals must be performed for performing chemical analysis of a sample for more than one chemical. Additionally, the position and/or orientations of the crystal and detector must be controlled and moved throughout a measurement to obtain a single spectrum.

Disclosed herein is a spectrometer system that provides high-efficiency, simultaneous, multi-element X-ray emission spectroscopy measurements of multiple element spectra. The measurements can be performed while varying temperature, pressure, and many other variables for analyzing elemental, and electronic transitions, under various conditions. The ability to simultaneously measure multiple emission lines allows for the possibility of measuring several elements within a given sample in a single measurement. In addition, the disclosed systems and methods allow for simultaneous detection of electronic changes on multiple elements in resonance with a single edge. Such observations are useful for analyzing multi-metallic species and metal-metal interactions, such as in mixed-metal metal organic frameworks, derived materials, structures which show promise in carbon dioxide reduction, hydrogen gas evolution, oxygen evolution reactions, and electrocatalytic reactions.

The described systems and methods can be used to detect subtle electronic changes, such as spin state and oxidation state changes in multi-metal battery materials, such as lithium ion batteries. The ability to perform in-situ measurements, as well as monitor multiple elements simultaneously allows for tracking electron propagation during the charge and discharge processes of battery materials, and further provides insight into understanding fundamental electrochemical processes that occur. Simplifying and streamlining multiple spectroscopy measurements into a single measurement may also be useful for tracking environmental samples with x-ray microprobes where several elements can be tracked simultaneously. Typical, spectroscopy systems are only able to measure a relative amount of material in a sample, whereas the disclosed system can also provide information related to oxidation and spin states of elements. The simultaneity of multiple measurements also removes the possibility that observed phenomena are a result of experimental changes (e.g., time between measurements, atmospheric degradation, etc.) that commonly occur between sequential measurements.

Figure 1A:
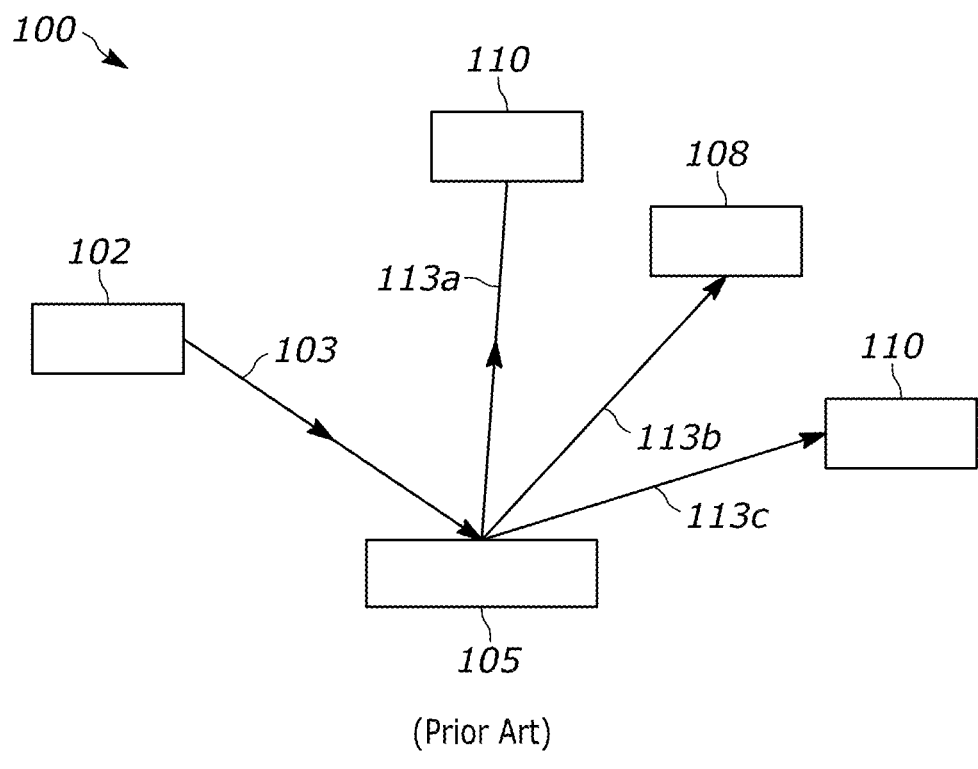
FIG. 1A is a schematic diagram of a wavelength-dispersive X-ray spectroscopy system.

FIG. 1A is a schematic diagram of a prior art wavelength-dispersive X-ray spectroscopy system 100. The system 100 includes a radiation source 102 that provides input radiation 103 to a diffracting element 105. The radiation source 102 may be a material that fluoresces to provide the input radiation 103. The radiation source may 102 may be any material for performing spectrometry on. The diffracting element 105 diffracts the input radiation 103 and provides output radiation 113a-113c that is spectrally separated in space. The output radiation 113a-113c then propagates through an aperture 110 to select a wavelength, or band of wavelengths, of the output radiation 113a-113c to detect. As illustrated, a mid-band of wavelengths 113b passes through the aperture 110 and is detected by a detector 108. A short-band of wavelengths 113a and a long-band of wavelengths 113c are blocked by optical beam blocks 111, or beam dumps, adjacent to the aperture 110. The beam blocks 111 may include one or more optical beam traps, diaphragms, or other devices for preventing radiation from propagating to the detector 108. To perform spectrometry, elements of the system 100 may be spatially moved to provide different wavelengths, or bands of wavelengths, to the detector 108. For example, the source 102 and the diffractive element 105 may be revolved and/or rotated to shift the spectrum of the output radiation 113a-113c to cause either of the short- or long-band of wavelengths 113a or 113c to pass through the aperture 110 and be detected by the detector 108. As such, a spectrometry measurement of the input radiation may be performed by scanning the spectrum of the diffracted output radiation 113a-113c across the detector 108.

Figure 1B:
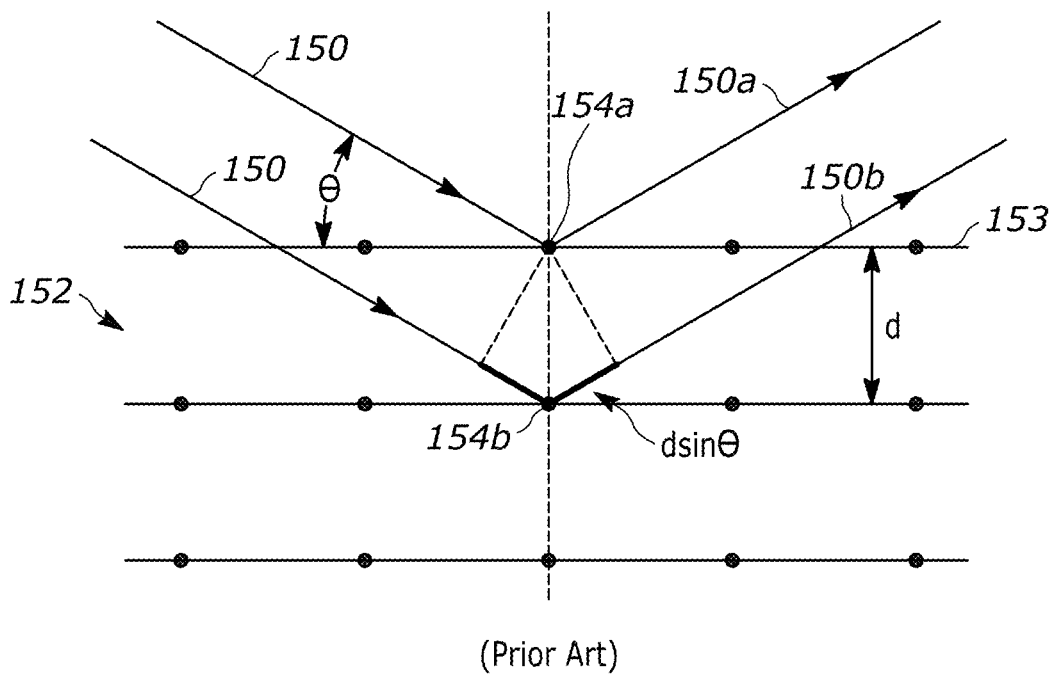
FIG. 1B is a diagram that illustrates the concept of Bragg's Law as utilized in a crystal based x-ray spectrometer.
Figure 1C:
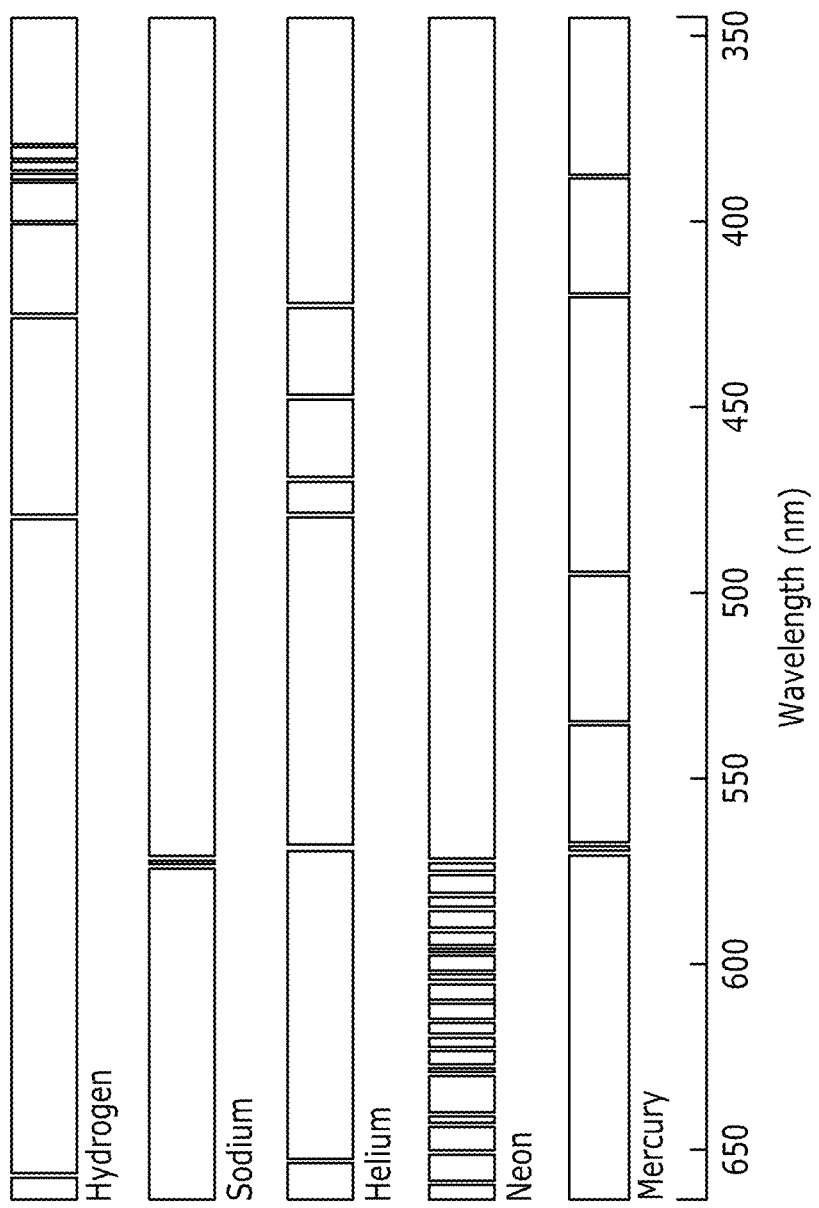
FIG. 1C is an emission line plot for five different elements.

Typically, for wavelength dispersive spectrometers, a crystal is employed as the diffractive element 105. Due to the periodic structure of a crystal, the crystal diffracts the input beam 103 according to Bragg's Law. FIG. 1B is a diagram that illustrates the concept of Bragg's Law as utilized in a crystal based X-ray spectrometer. An input beam 150 having a wavelength or band of wavelengths, λ, is incident on a surface 153 of a crystal 152. A first portion of radiation of the input beam 150 reflects off of a first atom 154a at the surface 153 of the crystal 152 to form a first reflected beam 150a. The first reflected beam 150a is reflected off of the atom at an angle θ. A second portion of radiation reflects off of a second atom 154b that is within the crystal 152, below the surface 153 of the crystal 152, to form a second reflected beam 150b. The second reflected beam 150b is also reflected at the angle θ. The first and second reflected beams 150a and 150b are then out of phase with the phase difference determined by a distance of the atomic crystal lattice, d. The first and second reflected beams 150a and 150b interfere constructively and destructively, and the spatial dispersion of the constructive interference of the wavelengths of the first and second reflected beams 150*a* and 150*b* can be determined by the Bragg equation:

$$2d^{*}\sin\theta = n\lambda,\qquad \text{EQ. 1}$$

where the left side of the equation, $2d^{*}\sin(\theta)$, represents the total phase difference between the first and second reflected beams 150*a* and 150*b*, and n is a positive integer representing the "diffraction order." Due to the periodic nature of an electromagnetic wave, constructive interference occurs maximally when the difference of the distance traversed by the first and second reflected beams 150*a* and 150*b* (i.e., the left side of the Bragg equation) is equal to a multiple of the wavelength (i.e., the right side of the Bragg equation). Therefore, the Bragg equation defines the crystal lattice distance, angle of reflection, and wavelength combinations for a given system that allow for constructive interference of wavelengths, or bands of wavelengths, of a spectrometer. An energy band of constructively interfering radiation may then be provided by a diffraction based spectrometer. The energy band of the constructively interfering radiation to be measured may have any wavelengths as long as the geometries and crystal lattice satisfy the Bragg equation, and the radiation provided to the sample has enough energy for causing the desired energies to be emitted from a sample.

The angle $\theta$ may be tuned to change the individual output beams' wavelengths that result in constructive interference. Additionally, the lattice distance d limits the range of tunable radiation energies, and typically, spectrometers are very lossy at large reflectance angles due to polarization effects. As such, typical spectrometers are not viable for generating a wide range of tunable energies. This results in only being able to measure one element of a material or sample at a time for typical spectrometer systems.

Figure 10:
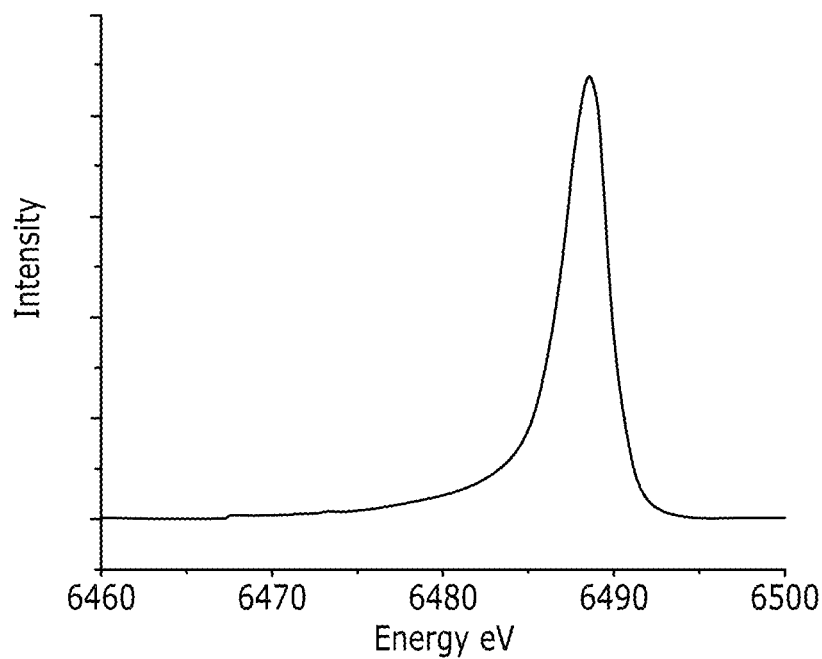
FIG. 10 is a measured emission spectrum of manganese.

Spectroscopy of radiation emitted from material samples allows for identification of the presence and concentration of atoms, elements, and compounds in the samples. Due to atomic transitions, each atom, element, or compound has characteristic radiation emission lines that can be used to identify the specific atom, element, or compound. FIG. 10 is an emission line plot for five different elements. The optical spectrum of radiation is presented as a horizontal black bar for each of the five elements: hydrogen, sodium, helium, neon, and mercury. The bright vertical lines in each spectral horizontal bar represent wavelengths that are emitted by each corresponding element. For example, hydrogen has atomic transitions that emit wavelengths just below 650 nm, between 500 and 450 nm, and even more at wavelengths less than 450 nm. Whereas neon only emits wavelengths longer than 550 nm, and therefore has lower energy atomic transitions. The described X-ray emission spectroscopy system may be used to measure multiple emission line spectra of samples simultaneously for performing material analysis. Further, the disclosed systems and methods may provide information about electronic dynamics of samples such as battery materials, which is unavailable using other spectroscopy systems. Each of these lines in the emission spectrum are called "emission lines." With the set of emission lines being indicative of a given atom, element, or molecule. As a person of ordinary skill in the art would recognize, the term "emission line" may also be referred to as "spectral lines." Additionally, "absorption edges" are wavelengths of radiation that are absorbed by an atom, element, or molecule.

Figure 2A:
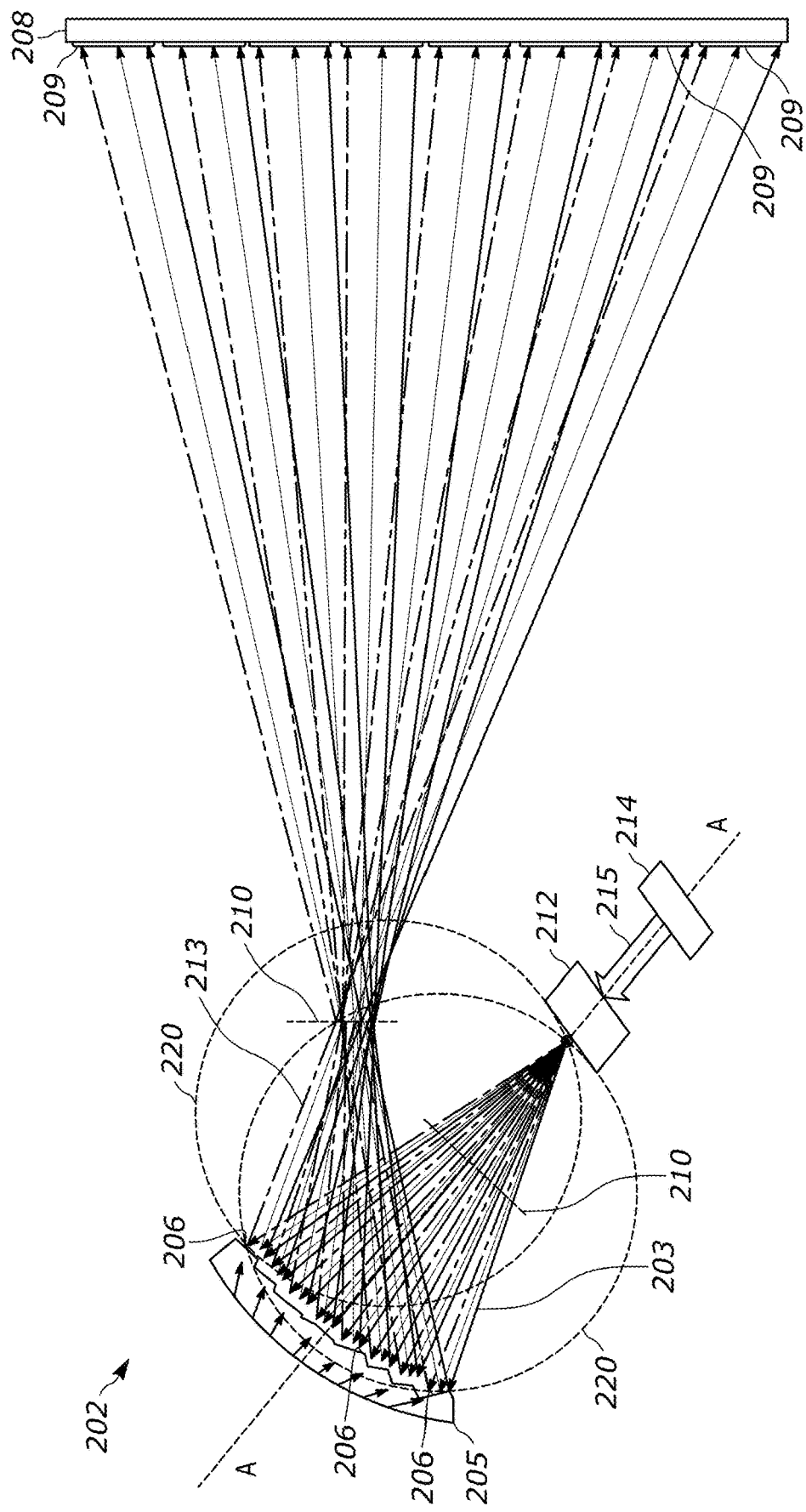
FIG. 2A is a schematic diagram of a multi-element X-ray emission spectrometer system for performing simultaneous spectroscopy measurements of multiple chemical elements, molecules, or compounds.

Described herein is a system for performing a plurality of spectrometry measurements of a sample simultaneously. The system utilizes multiple crystals in an array for diffracting radiation onto an area detector. A crystal mount supports each crystal in a specific position and orientation for performing the spectrometry measurement. FIG. 2A is a schematic of a multi-element X-ray emission spectrometer system 200 for performing simultaneous spectroscopy measurements of multiple chemical elements, molecules, or compounds of a sample. The system includes a spectrometer 202 with a diffractive element 205, and a detector 208. The diffractive element 205 includes a plurality of crystals 206 arranged in a two-dimensional (2D) array, as will be discussed further herein. In implementations, the crystals 206 are crystals having flat surfaces, with the crystals 206 disposed to receive radiation thereon. Flat crystals are purely dispersive as compared to optical effects of curved crystals and materials. Further, flat crystals are not commonly used due to a requirement of using tightly focused beams due to the purely dispersive nature of the flat crystals. The diffractive element 205 includes a crystal holder 207 that supports each crystal 206 and maintains a respective position and orientation of each crystal 206 relative to an optical axis A. Each crystal 206 is positioned and oriented, respectively, to diffract the input radiation 203 as diffracted radiation 213 onto a corresponding region of the detector 208. Each crystal 206 may be germanium, silicon, lithium niobate, sapphire, quartz, a first row transition metal, or another crystal material. Curved diffractive elements, such as spherical or cylindrical crystal surfaces, are limited in the types of crystal materials that may be used. Using flat crystals, as described herein, allows for any crystalline material to be used for crystals 206 as long as the crystal material has a desired lattice spacing for measuring a given wavelength or band of wavelengths according to the Bragg equation.

The detector 208 may be a 2D position sensitive detector (PSD) that provides information about both the intensity of light and location of detection on the detector. For example, the detector 208 may include a pixel array formed by an array of sensors 209, and each crystal 206 may reflectively diffract the radiation onto mutually exclusive active areas of the detector 208. The detector 208 may then provide information indicative of both radiation intensity for a given pixel, and pixel position. The spectral content of the radiation can then be determined by the intensity and position information provided by the sensors 209. The total measurable spectral range depends on both the distance between the detector 208 and the diffractive element 205, and the active area of the detector. The detector 208 must be positioned far enough away from the diffractive element 205 to properly resolve the spectral content at the detector 208. So increasing the distance between the detector 208 and the diffractive element 205 increases the potential resolution of the spectral measurement, but requires a larger active area detector to detect all of the spectrum. For example, some typical detectors for performing spectroscopy measurements have active areas of about 70 to 80 mm by 30 to 40 mm. As further discussed below with respect to the data of FIGS. 8-11, a system was constructed that implemented a detector (Pilatus 2M) having an area of 254 by 289 mm, which is about 24 to 25 times larger than other typical detectors used for spectroscopy. Given the inherent constraints in the module of the large area detector used, this limited the spectral range of the system to the mainline emission of the k$\beta$ emission line, but allowed for usage of the entire detector to measure all the crystal reflections simultaneously using a detector that is approximately 25 times larger than standard detectors used for these types of measurements. A large area detector for performing the disclosed methods may have a variety of active areas including, without limitation, areas of 20 by 100 mm, 30 by 100 mm, 50 by 100 mm, 100 by 100 mm, greater than 100 mm by 100 mm in each dimension, between 100 and 300 mm in each dimension, between 100 mm and 500 mm in each dimension, between 300 and 800 mm in each dimension or between 500 and 1000 mm in each direction. Further, a large area detector may include a plurality of detection modules each having one or more active area detectors for increasing an overall active area of the detector 208. A large area detector for performing the disclosed methods may have a variety of active areas sizes without any strict limit and any plurality of detector modules, as long as there is sufficient length in single dimension to provide resolution. Crystal holder array needs to be specifically tailored for any arbitrary detector active area size.

Figure 2B:
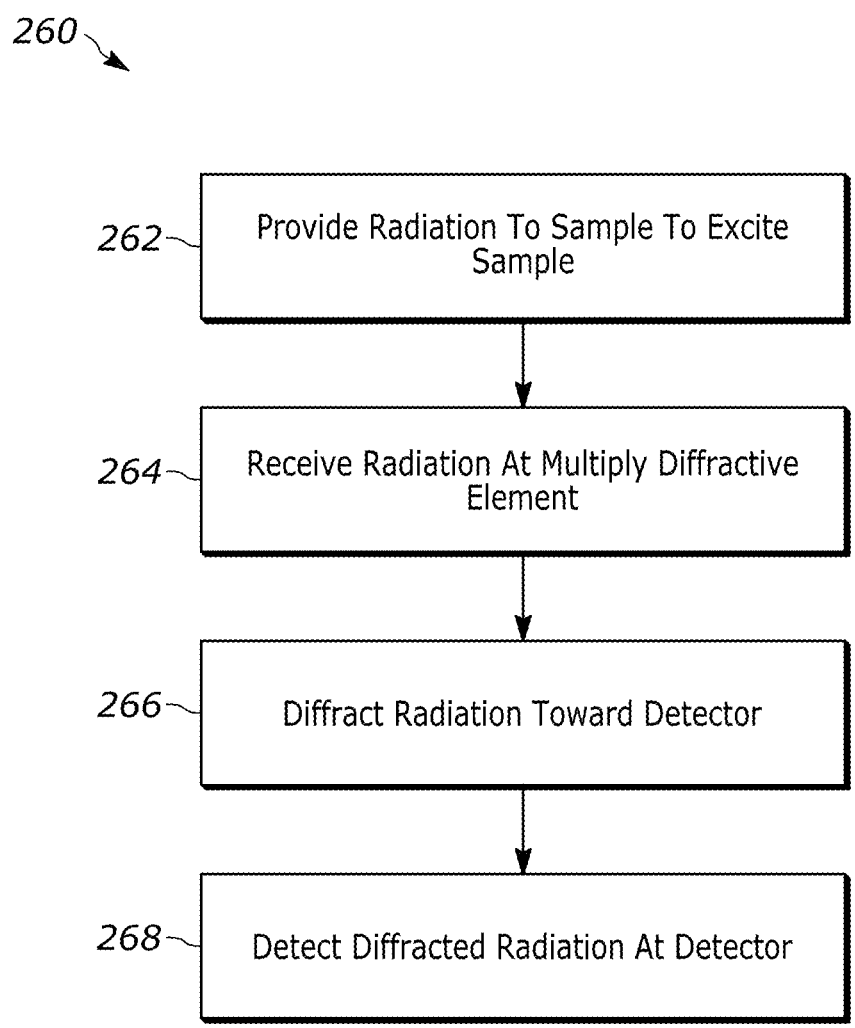
FIG. 2B is a flow diagram of a method for performing simultaneous, multi-element spectroscopy using the system of FIG. 2A.

FIG. 2B is a flow diagram of a method 260 for performing simultaneous, multi-element spectroscopy using the system 200 of FIG. 2A. Referring now simultaneously to FIGS. 2A and 2B, a sample 212 is disposed along the optical axis A, and the sample 212 provides the input radiation 203 to the crystals 206 of the diffractive element 205 (block 262). The sample 212 may be a material that fluoresces to provide the input radiation 203. For example, X-ray radiation may be provided to the sample 212 by an X-ray source (not shown) to excite atoms, elements, or molecules of the sample 212. The sample 212 then emits an emission spectrum as the input radiation 203. The emission spectrum is characteristic of atomic, elemental, and molecular transitions from excitation states, which is indicative of a type of atom, element, or molecule of the sample. Therefore, performing spectroscopy of the input radiation 203 allows for identification of materials, and concentrations of materials, of the sample 212. Further, due to increased efficiency, the described spectroscopy systems and methods allow for the measurement of weaker emission lines that are unable to be observed by other spectroscopy systems, such as the k☐ emission line further described herein.

The input radiation 203 is provided to the crystals 206 of the diffractive element 205 (block 264). The diffractive element 205 supports a 2D array of crystals 206, with each crystal being along a Rowland circle 220. The Rowland circle 220 geometry ensures that each crystal 206 is at a position, and angular orientation, to diffract the input radiation 203 and direct the diffracted radiation 213 to a point on the circumference of each crystal's 206 corresponding Rowland circle 220. Further, each of the crystals 206 have an angular orientation such that a desired energy of radiation is diffracted onto a desired corresponding area of the detector 208. The spectrometer 202 may include apertures 210 along the optical axis A, or in the path of propagation of the diffracted radiation 213 for performing spatial, and spectral filtering of the input and/or diffracted radiation 203 and 213.

Figure 2C:
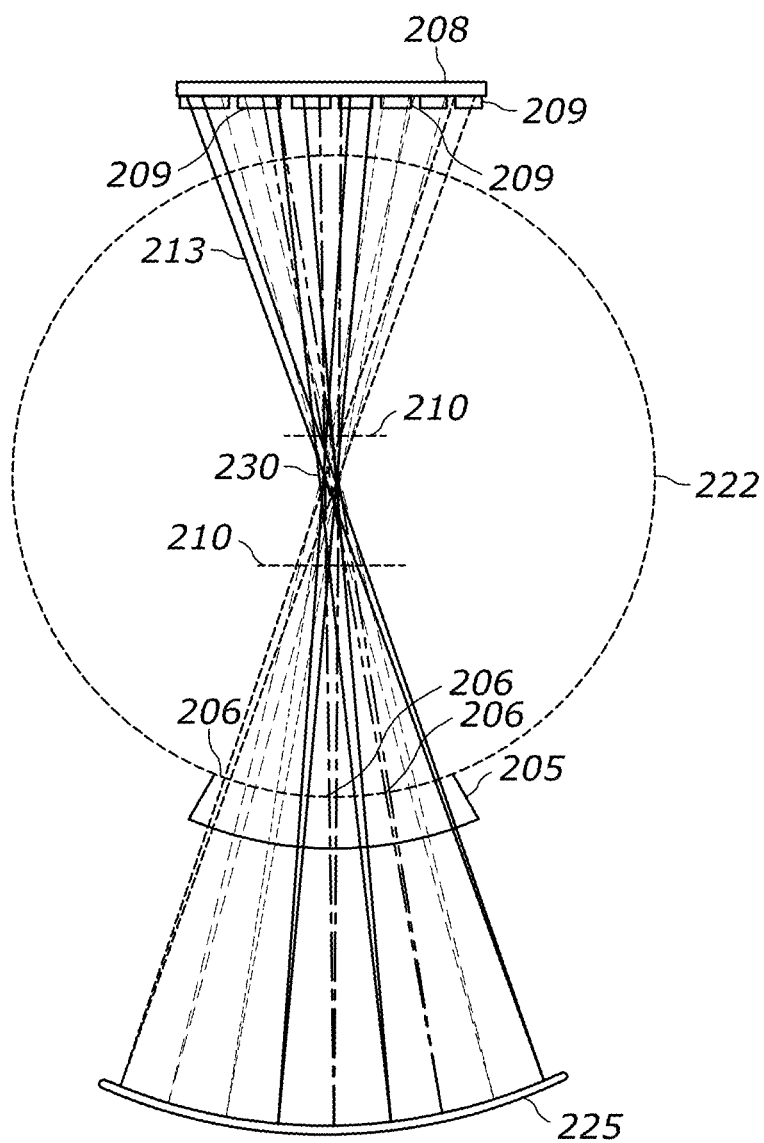
FIG. 2C is a top view of a ray diagram of a multi-element X-ray emission spectrometer system.

FIG. 2C is a top view of a ray diagram of the spectrometer 202 without the sample 212 for clarity. The diffractive element 205 is disposed with the angle orientation of each crystal 206 being along a Von Hamos circle 222. As modeled geometrically, the spectral content of the diffracted radiation may be considered to be provided by virtual sources 225 disposed behind the diffractive element 205. As a person of ordinary skill in the art would understand, in actuality the input radiation is provided by the sample 212, which would be disposed at focal point 230 in FIG. 2B. The virtual sources 225 are used to model the diffraction of the spectral content of the input radiation 203. The Von Hamos geometry illustrated in FIG. 2C allows for each of the spectral lines to be focused at the main focal point 230, which allows for each line of the spectrum to be imaged at the detector 208 simultaneously.

Referring again to FIGS. 2A and 2B, the crystals 206 of the diffractive element 205 diffract the input radiation 203 onto the detector 208 (block 266). The detector detects the diffracted radiation (block 268). The detector 208 generates an electrical signal indicative of the detected diffracted radiation, and the detector 208 may provide the electrical signal to a processor, a memory, a server, or another device for storing, or further processing, the electrical signal. The electrical signal may then be processed for determine the spectral content of the input radiation. For example, the electrical signal may be indicative of 2D spatial intensity image of the radiation detected by the detector 208. A processor may then determine the spectral content of the input radiation from the 2D spatial intensity image information.

Figure 3A:
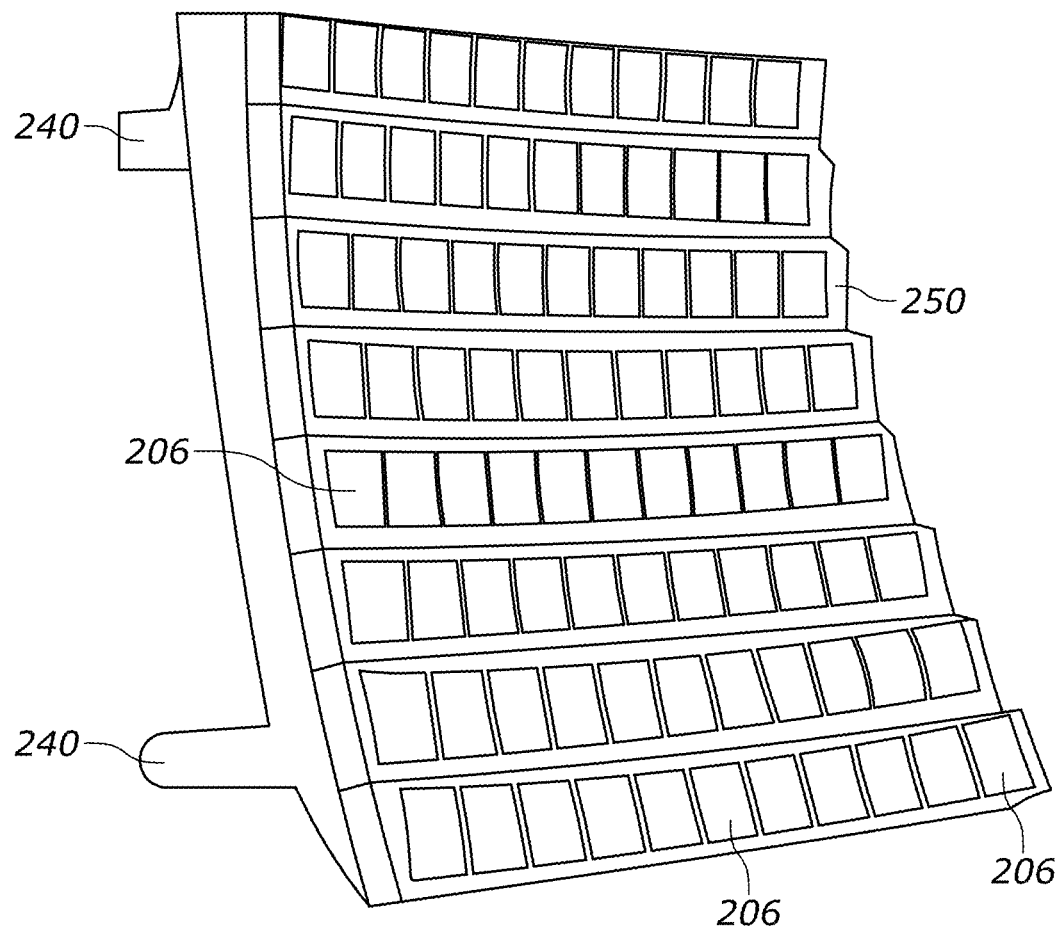
FIG. 3A is a perspective view of an example of a diffractive element having 72 crystals for performing simultaneous multi-element spectroscopy measurements.
Figure 3B:
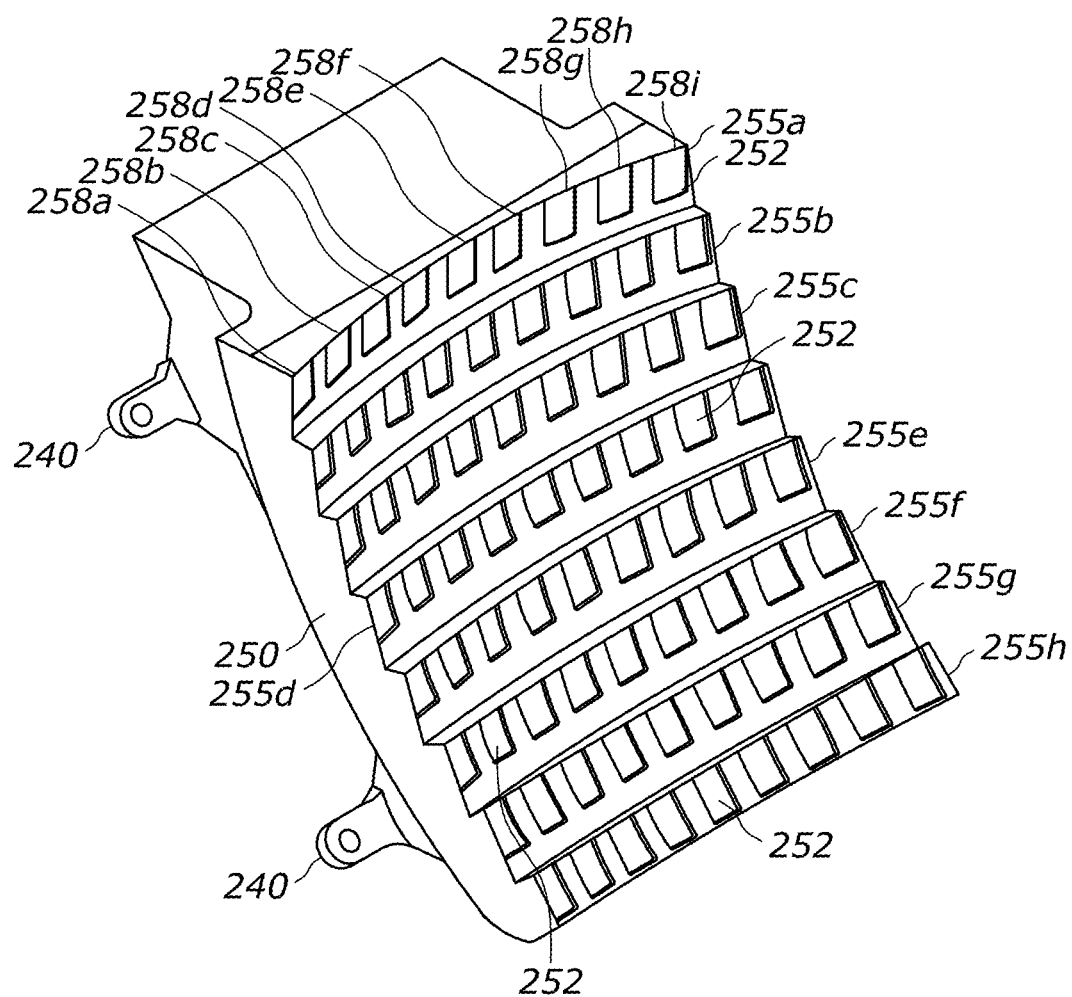
FIG. 3B illustrates the diffractive element of FIG. 3A without crystals in the crystal position mounts.

FIGS. 3A and 3B are perspective views of an example diffractive element 205 having 72 crystals for performing simultaneous, multi-element spectroscopy measurements. The diffractive element 205 may be implemented as the diffractive element of FIGS. 2A and 2B. The diffractive element 205 includes a diffractive element mount 250 having a plurality of crystal position mounts 252 thereon. FIG. 3A illustrates the diffractive element 250 having crystals 206 disposed in the crystal position mounts 252, while FIG. 3B illustrates the diffractive element 250 without crystals 206 in the crystal position mounts 252. Each of the crystal position mounts 252 is in a row 255a-255h of crystal position mounts. Each row 255a-255h of crystal position mounts supports a plurality of crystals 206 in respective positions and angular orientations along a respective Von Hamos circle 205, as illustrated in FIG. 2B. Additionally, each crystal position mount 252 belongs to a column 258a-258i of crystal position mounts. Each column 258a-258i of crystal position mounts supports a plurality of crystals 206 in respective positions and angular orientations along a respective Rowland circle, as illustrated in FIG. 2A. By using the Rowland and Von Hamos geometries, each of the crystal position mounts 252 is configured to support a respective crystal at a same distance from, and relative angle to, a sample at the focal point 230. Each of the crystals may be positioned to have a same Bragg angle for the radiation incident on each crystal. A vacuum grease may be applied to each crystal position mount 252 to provide some adherence of the crystals 206 to each corresponding crystal position mount 252. Further, a temporary adhesive may be used to physically coupled the crystals 206 to the crystal position mounts 252. In such implementations, the crystals 206 may be removable from the crystal position mounts 252. Alternatively, a permanent adhesive may be used to couple the crystals 206 to the crystal position mounts 252.

Each crystal 206 for a given row 255a-255h of crystals may be a same crystal material. For example, each crystal 206 of the first crystal row 255a may be a germanium crystal, while each crystal 206 of the second row 255b of crystals 206 may be a lithium niobate crystal. As such, each row 255a-255h of crystals 206 may diffract a different band of wavelengths of the input radiation 203. Therefore, each row 255a-255i of crystals 206 may be considered to measure a different atom, element, or compound. Additionally, each crystal 206 of a row 255a-255h of crystals 206 may include only crystals of a specific crystal lattice orientation for measuring different spectrums of different atoms, elements, or molecules. Increasing the number of crystals 206 for measuring a specific atom, element, or compound increases the received signal of emission lines. For example, having crystals 206 of the first two rows 255a, 255b of crystals 206 being a same crystal material may allow for an increased signal in measuring a corresponding atom, element, or compound. By increasing the number of same crystal types, the signal for a given emission line may be increased. Therefore, low level or lower intensity emission lines may be observed by the disclosed spectrometer as compared to other spectroscopy systems. Alternatively, crystals 206 of a single row 255a-255h may each be of different materials and/or crystal orientations depending on desired signal amplitudes and the desired number of elements for measuring. As illustrated, the diffractive element mount 250 has 8 rows 255a-255h of crystal position mounts 252, and 9 columns 258a-258i of crystal position mounts 252, resulting in 72 crystal position mounts 252. In embodiments, the diffractive element mount 250 may have more or fewer rows 255a-255h of crystal position mounts 252, and more or fewer columns 258a-258i of crystal position mounts 252 for performing simultaneous multi-element spectroscopy as described herein.

The diffractive element 205 may also include mounts 240 for mounting the diffractive element 205 into an active imaging position along an optical axis. The active imaging position being a position in which crystals disposed in the diffractive element 205 are positioned to receive radiation from a sample or source, for performing spectroscopy. The diffractive element 205 may be mounted on a stage in a spectroscopy system with the stage being a translatable (e.g., 1D, 2D, or 3D translation stage), or rotatable stage that allows for aligning the diffractive element along the optical axis (e.g., optical axis A of FIG. 2A). The mounts 240 may include one or more elements including screws, screw holes, nuts, clips, bolts, optical breadboard mounts or mounting holes, or another mechanical means for supporting a position of the diffractive element 205 along an optical axis. Further, the mounts 240 allow for removal of the diffractive element 205 from the spectrometer 202, and the replacement with another diffractive element (not shown) in the spectrometer. The ability to mount different diffractive elements allows for a simplified way to perform a plurality of spectrometry measurements using different arrays of crystals. Therefore, while the spectrometer 202 may perform simultaneous, multi-element spectroscopy measurements, the spectrometer 202 may also perform sequential spectroscopy measurements of samples using an even wider array of crystals 206 employed in different diffractive elements 205.

The 8×9 array diffractive element 205 of FIGS. 3A and 3B was fabricated and implemented in a spectrometer system 200 as illustrated in FIGS. 2A and 2B. The resulting spectrometer demonstrated multi-element k$\square$ X-ray emission detection using 72 crystals arranged in the eight rows and nine columns. The detector 208 was a large area PSD (Pilatus 2M) that had 24 different sensing modules arranged in three columns and eight rows. Each module had a width of approximately 84 mm and a 36 mm height resulting in an overall detector active area of 252×288 mm$^2$. Modules had 172×172 $\mu m^2$ pixels, and the detector 208 had a total of 2.476 million pixels.

The spectrometer employed seven different types of crystals, and was therefore capable of measuring seven different material elements simultaneously. Using 72 crystals 206 in the 8×9 array allows for measuring up to seven emission lines for seven elements simultaneously. Eight rows were chosen for the diffractive element mount 250 with each row 255a-255h of crystal position mounts 252 configured to diffract radiation onto a different module of the detector 208. The number of columns of the diffractive element mount 250 was determined based on the Rowland and von Hamos geometries, the widths of the crystals 206, and the distance from the diffractive element 205 to the detector 208. The nine columns were chosen according to each of the mentioned geometries, and to reduce overlap of diffracted radiation from adjacent crystals 206. The resultant 72 crystal, 8×9 array used crystals 206 having a width of 8 mm and a height of 6 mm, and each crystal 206 was supported at a position 147.5 mm away from the sample 212.

The position of the sample 212 may be independently controllable by translation and/or rotation stages to properly align the sample 212 along the optical axis A to provide radiation to the diffractive element 205. For example, the sample 212 may be disposed in a cuvette that is mounted on a 3D translation stage that is rotatable about one or more axis. The sample 212 may be measured in any standard form, such as solid material and thin films. There is also sufficient sample stage area or sample placement area on the spectrometer to accommodate bulkier setups, such as flow cell, jet spray and in-situ electrocatalytic cells as well as in-operando battery, allowing for measurements of variety of sample formats. As previously mentioned, X-ray radiation is provided to the sample 212 to excite the sample. The X-ray radiation may be provided by a, X-ray tube, X-ray laser, a synchrotron, an undulator, or another type of X-ray radiation source.

Figure 4:
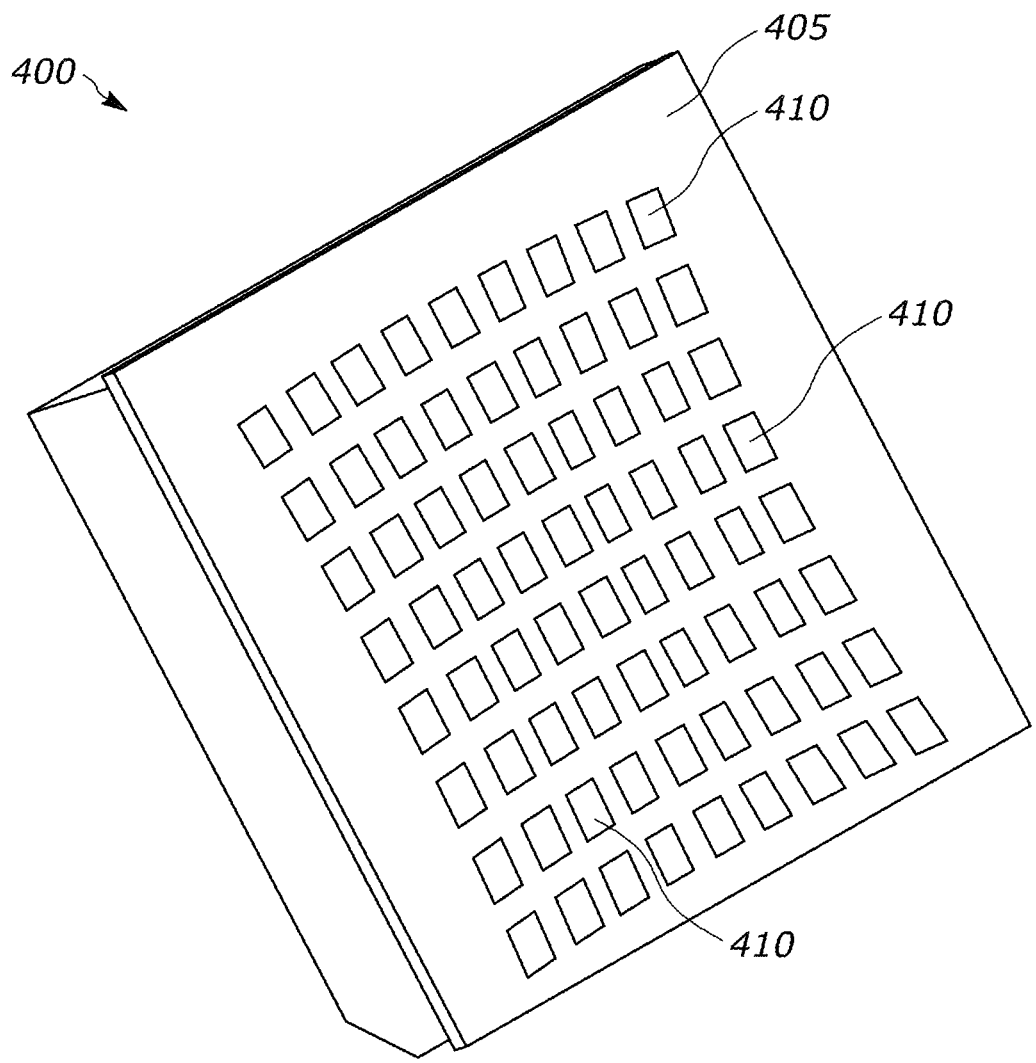
FIG. 4 is a perspective view of an example entrance aperture for performing simultaneous multi-element spectroscopy as described herein.

The sample 212 was positioned 70 mm away from a first aperture being an entrance aperture (e.g., aperture 210 along optical axis A in FIG. 2A). FIG. 4 is a perspective view of an example entrance aperture element 400 for performing simultaneous, multi-element spectroscopy as described herein. The entrance aperture element 400 having apertures 410 therethrough, and a front surface 405. Each aperture 410 is a rectangular hole through the entrance aperture element 400 for transmitting radiation through. The number and position of apertures 410 are dependent on the number and position of crystals 206 of the diffraction element 205. As illustrated in FIG. 4, the entrance aperture element 400 includes 72 apertures 410 disposed in an 8×9 array. Each aperture 410 is positioned to provide a portion of the input radiation 203 to a respective crystal 206. The front surface 405 of the entrance aperture element 400 blocks unwanted radiation from entering the spectrometer 202, therefore reducing noise in the spectrometer. For example, the front surface 210 blocks radiation from the source that would be incident on the diffractive element mount 250 between columns, or between rows of crystals 206. Radiation that enters the spectrometer, that is not diffracted by a crystal 206, may reflect off a variety of surfaces and be detected by the detector 208 which may reduce the sensitivity, resolution, and accuracy of spectrometry measurements due to increase in background radiation and background noise as a result of those scatterings. Additionally, an exit aperture (e.g., aperture 210 along the path of the diffracted radiation 213 in FIG. 2A) may be used to further provide spatial filtering of unwanted radiation, including unwanted emission lines provided through Bragg diffraction off neighboring crystals or emissions from sources other than the intended sample (e.g., emission lines of other transitions, or outside of a desired energy range). Each of the desired energies of the diffracted radiation converges at the exit aperture 210 and the exit aperture 210 transmits the desired bands of the diffracted radiation 213.

Figures 6, 7:
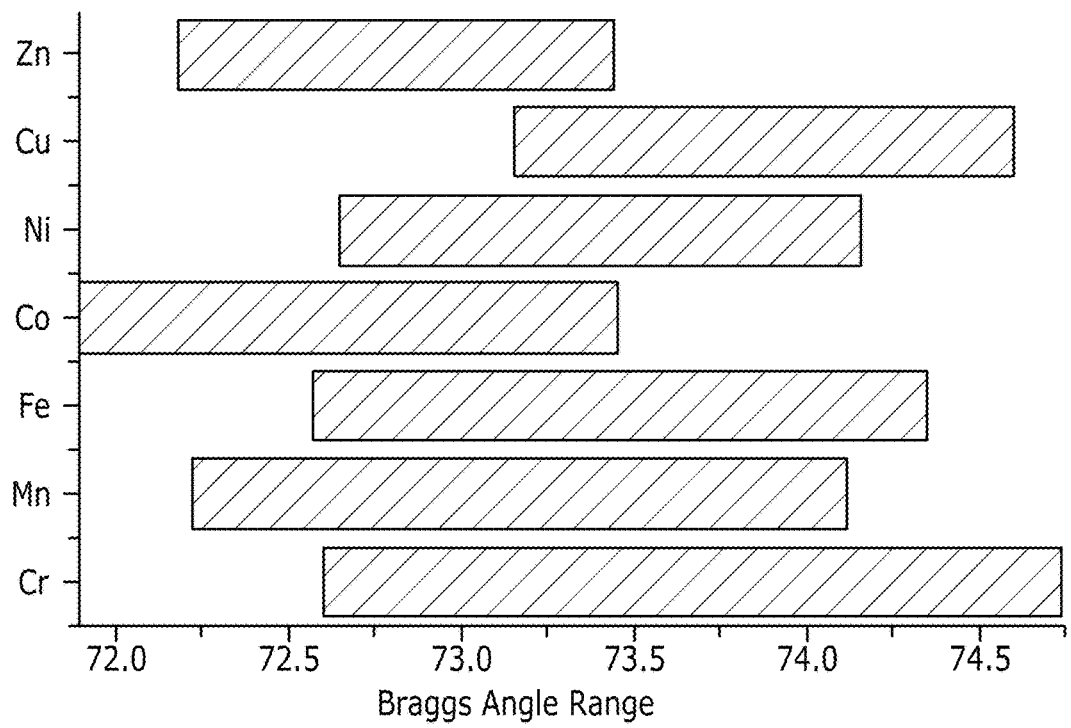
FIG. 6 is a plot of Bragg Angle range for 7 elements for performing spectroscopy.
FIG. 7 is a table of energy resolutions for 7 elements for performing spectroscopy.

FIG. 5 is a table of information for the constructed spectrometer system including the seven measurable elements and corresponding k$\square$13 transition energies, crystal types, crystal reflection vectors, and additional information. The described system and methods can be used to perform spectrometry of a wide range of elements and spectrums. The constructed spectrometer used crystals for measuring emission lines of seven first row transition metal elements:

chromium, manganese, iron, cobalt, nickel, copper, and zinc. The Bragg angles reported in FIG. 5 were selected such that a strong emission line from the kβ transition was observed, resulting in a Bragg angle range of between 71.89° to 74.75° for each row 255a-255h of crystal position mounts 252, and for the corresponding crystals 206 disposed therein. FIG. 6 is a plot of Bragg angle range for each element. The range of Bragg angles presented in FIG. 6 allows for probing of a wavelength range in a region of interest (ROI) around each elements corresponding emission line energy. Each ROI spanned from 45 eV below an emission line energy (i.e., kβ13 eV), to 20 eV above the emission line energy. Additionally, the seven elements were selected such that readily available crystal materials, and crystal cuts, could be used. The silicon and germanium crystals were readily available, with only the single LiNbO₃ crystal being of any more difficult material and cut. The crystals are able to fit inside the mounts without additional assistance, however some Si based vacuum grease/adhesive was also used to secure the crystals in their respective slots without removing the ability to remove them at later point.

While different emission lines and transitions may be measured using the spectrometer 202, the kβ emission line was chosen for each of the elements as it can provide additional electronic information about a sample, such as oxidation and spin information. The kβ emission is due to an electron transition from the 3p orbital down to a ground state of a sample. The extra electronic information is able to be determined due to the proximity of 3p orbitals to the 3d orbitals of the metals, resulting in mixing of the two orbitals. This inherently embeds information about the 3d orbits into the electron transition from the 3p orbital. This, however, comes at the expense of the difficulties associated with measuring the significantly weaker kβ signal as compared to traditionally measured kα emission, but this does provide the extra electronic information intrinsic to the kβ emission providing incentive to measure the much weaker kβ emissions.

The energy resolution (i.e., spectral resolution) of the spectrometer 202 was determined from the pixel size of the detector 208, diffracted radiation 213 beam spot sizes at the detector 208, and the Darwin width of the diffracted radiation. The Darwin width is an angular width over which the radiation is reflected from a crystal, and is therefore dependent on the crystal materials, and wavelengths of radiation. The spot size was determined to be 25×25 microns, and each pixel was 172×172 microns, meaning that each pixel was large enough to capture multiple diffracted beams, and therefore, multiple diffracted energies. FIG. 7 is a table of energy resolutions for each of the seven elements being measured. The table is organized with lighter elements (i.e., Cr, and Mn) up top and heavier elements (i.e., Cu, and Zn) at the bottom. The average resolution of the spectrometer increases as the elements increase in atomic weight due to a decrease in the backscattering energy for corresponding crystals 206.

The efficiency of a spectrometer often relies on overall attenuation of radiation in the form of losses, and a collection efficiency of the spectrometer. The attenuations of X-ray radiation were reduced by reducing the path lengths between the various components of the spectrometer 202, and by propagating the X-ray radiation through a low absorption medium (e.g., helium gas). The collection efficiency of the spectrometer is dependent on the reflectivities of the diffractive crystals, which are intrinsic to each independent crystal material and cut, and on the solid angle collected by the spectrometer. Therefore, the solid angle may be tuned to increase the overall efficiency of a spectrometer. The solid angle, Ω, collected by a spectrometer is given by $$\Omega = \left(\frac{abn}{R^2}\right)\sin\theta, \qquad \text{EQ. 1}$$

with ab being the active diffraction area of a crystal, n being the number of crystals, R being a radius of curvature of the von Hamos circle 222 as illustrated in FIG. 2C, which provides the distance from the sample 212 to the crystals 206, and θ being the Bragg angle of the diffractive element 205. Using the 72 8×6 mm² crystals, and a midpoint Bragg angle of 73.32° across all of the elements, a solid angle of 153 msr is obtained. Specifically, the solid angle ranged from a low of 107 msr/eV for Zn, to 172 msr/eV for Cr, with the solid angles of the other elements between those two values. These solid angle values are 8 to 10 times larger than typical X-ray emission spectrometers that have solid angles of around 15 to 20 msr. Therefore, the disclosed systems provide for an increased overall efficiency which allows for the measurement of lower intensity emission lines and lower intensity signals as compared to other spectrometers.

Figure 8:
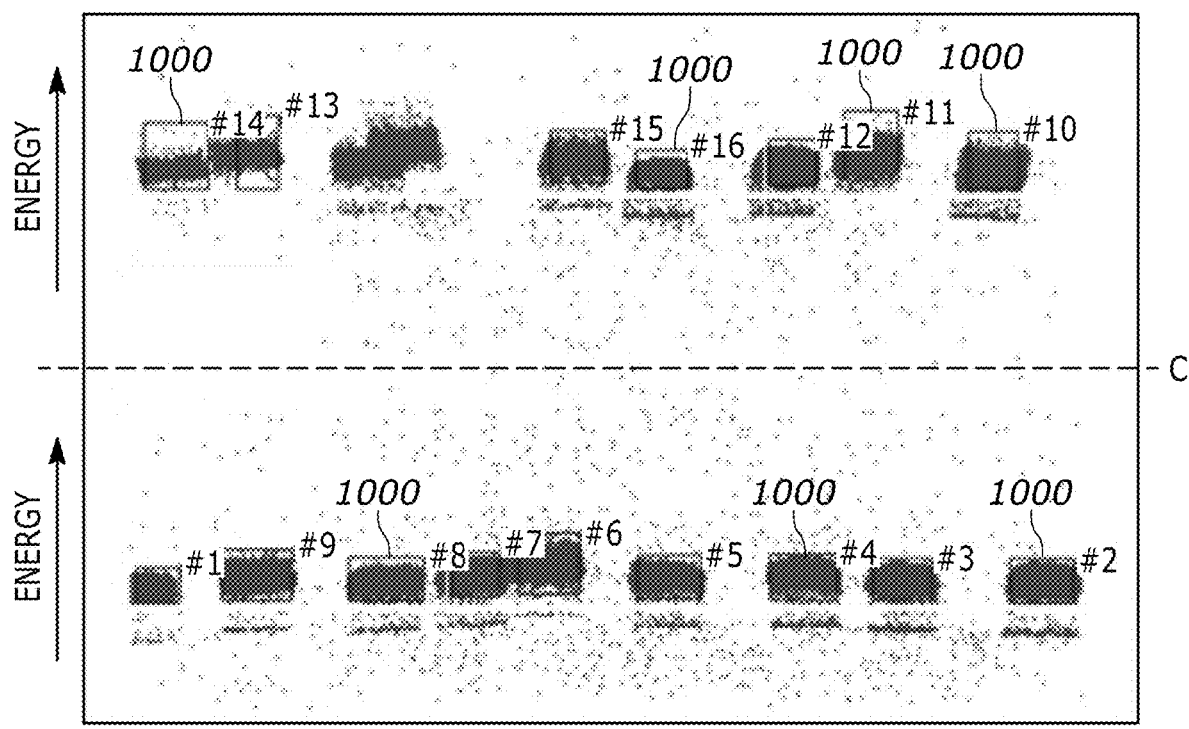
FIG. 8 is an image of manganese measurement crystals as captured by a multi-element spectroscopy system.
Figure 9:
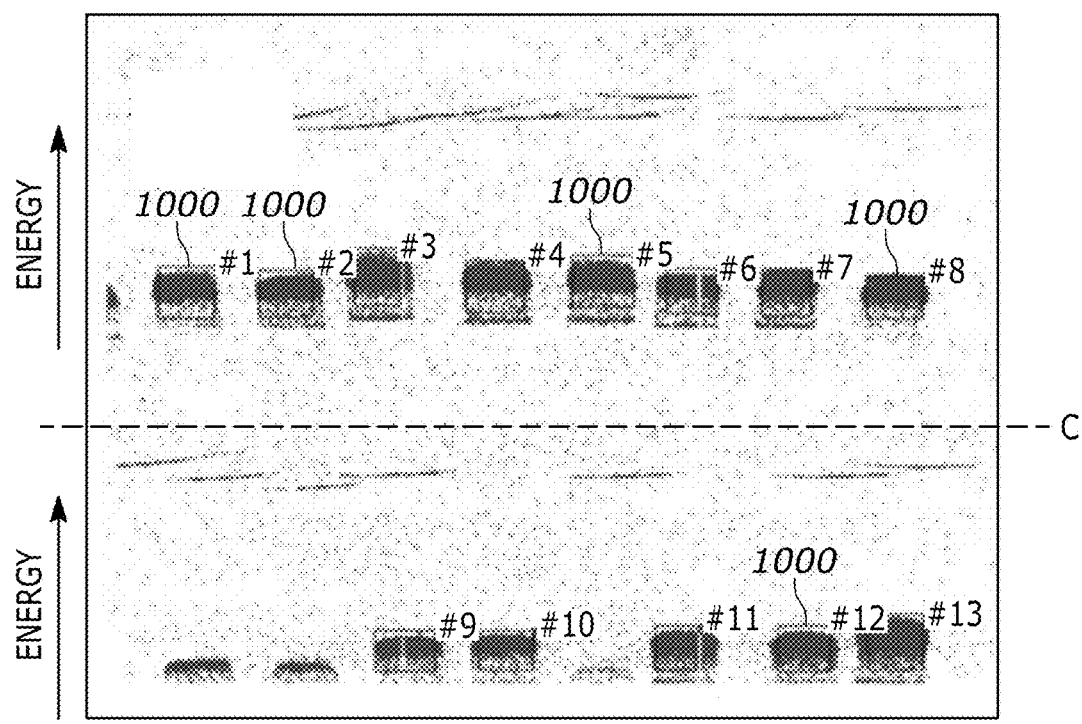
FIG. 9 is an image of chromium measurement crystals as captured by a multi-element spectroscopy system.

The spectroscopy system 202 was used to measure four different elements simultaneously: Cr, Mn, Ni, and Zn. Crystals were placed in every other column of crystal position mounts, for example in FIG. 2A, crystals were placed in columns 258a, 258c, 258e, 258g, and 258i, with pairs of rows having a same crystal type for measuring one of the four elements. Explicitly crystals in rows 255a and 255b were to measure Cr, in rows 255c and 255d were to measure Mn, in rows 255e and 255f were to measure Ni, and in rows 255g and 255h were to measure Zn. FIGS. 8 and 9 are images by the detector 208 of the Mn measurement crystals and Cr measurement crystals respectively. The square/rectangular spots in the images are optical signals detected from individual crystals. The vertical axis represents increasing energy or detected radiation across a single rectangular region. Two rows of diffracted signals are visible in both FIG. 8 and FIG. 9, separated by a central line C. The top row of each figure are signals received from a first row of crystals (i.e., rows 255c and 255e for measuring Cr and Mn respectively), while the lower row of images are signals received from a second, lower row of crystals (i.e., rows 255d and 255f for measuring Cr and Mn respectively) in the crystal position mount. The energy of each row of crystals increases vertically from bottom to top as illustrated.

Each of the imaged diffracted signals is outline by a rectangular calibration box that indicates a region of interest 1000 on a 2D wide area detector. Before the measurements were conducted, a spatial calibration procedure was performed to the pixel regions of the detector that are indicative of the energy ranges of radiation diffracted by each crystal. Each of the rectangular boxes indicates a region of interest 1000 of the detector 208 that receives a desired band of radiation energies for performing the measurement of Cr and Mn in FIGS. 8 and 9 respectively. The intensity of the received radiation varies vertically across each region of interest 1000 providing information indicative of the spectra of the diffracted radiation. Other lines and spots in the images of FIGS. 8 and 9 are due to random noise, elastic scattering of radiation off of the crystals, or undesired radiation reach the detector 208.

Figure 11:
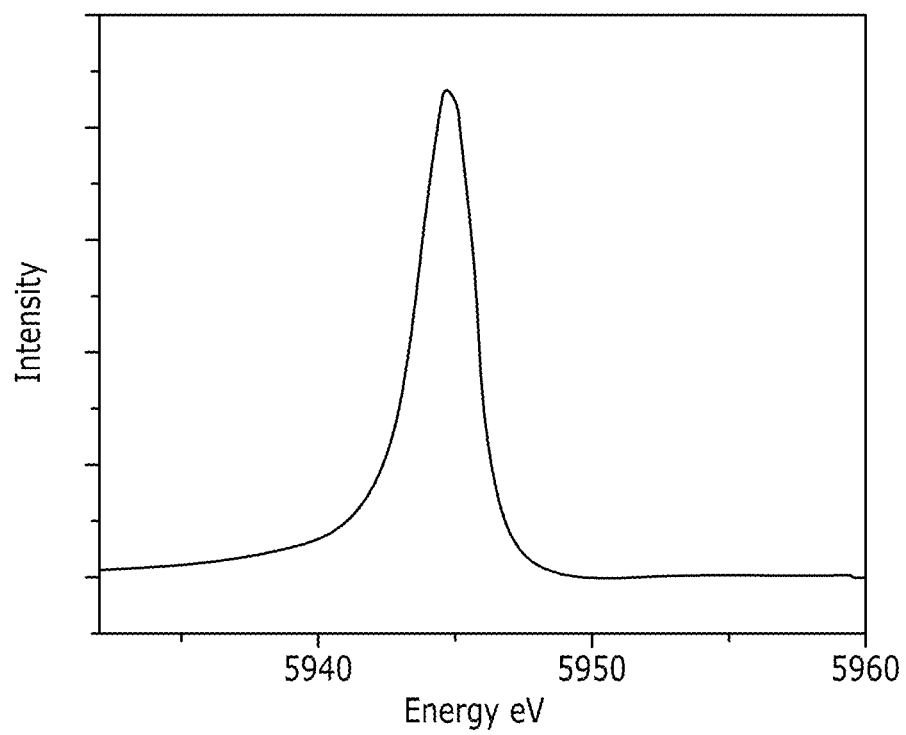
FIG. 11 is a measured emission spectrum of chromium

FIGS. 10 and 11 are measured spectra of Mn and Cr respectively. The spectra of FIGS. 10 and 11 are determined from the images of FIGS. 8 and 9. The spectra presented in FIGS. 10 and 11 are the resultant spectra from averaging of all the spectra in each region of interest 1000 of FIGS. 8 and 9 respectively. As such, the x-axes of FIGS. 10 and 11 span the energies spanned vertically by the corresponding regions of interest 1000 of FIGS. 8 and 9. The spectra shown in FIGS. 10 and 11 may be generated by another form of processing such as integrating or binning of values of the spectra in each region of interest 1000. Each of the spectra shows a clear emission peak at corresponding energies for each element. The images and spectra shown in FIGS. 8 through 11 demonstrate the ability to perform simultaneous multi-element spectroscopy using the described system utilizing the crystal array diffraction element described herein.

Figure 12:
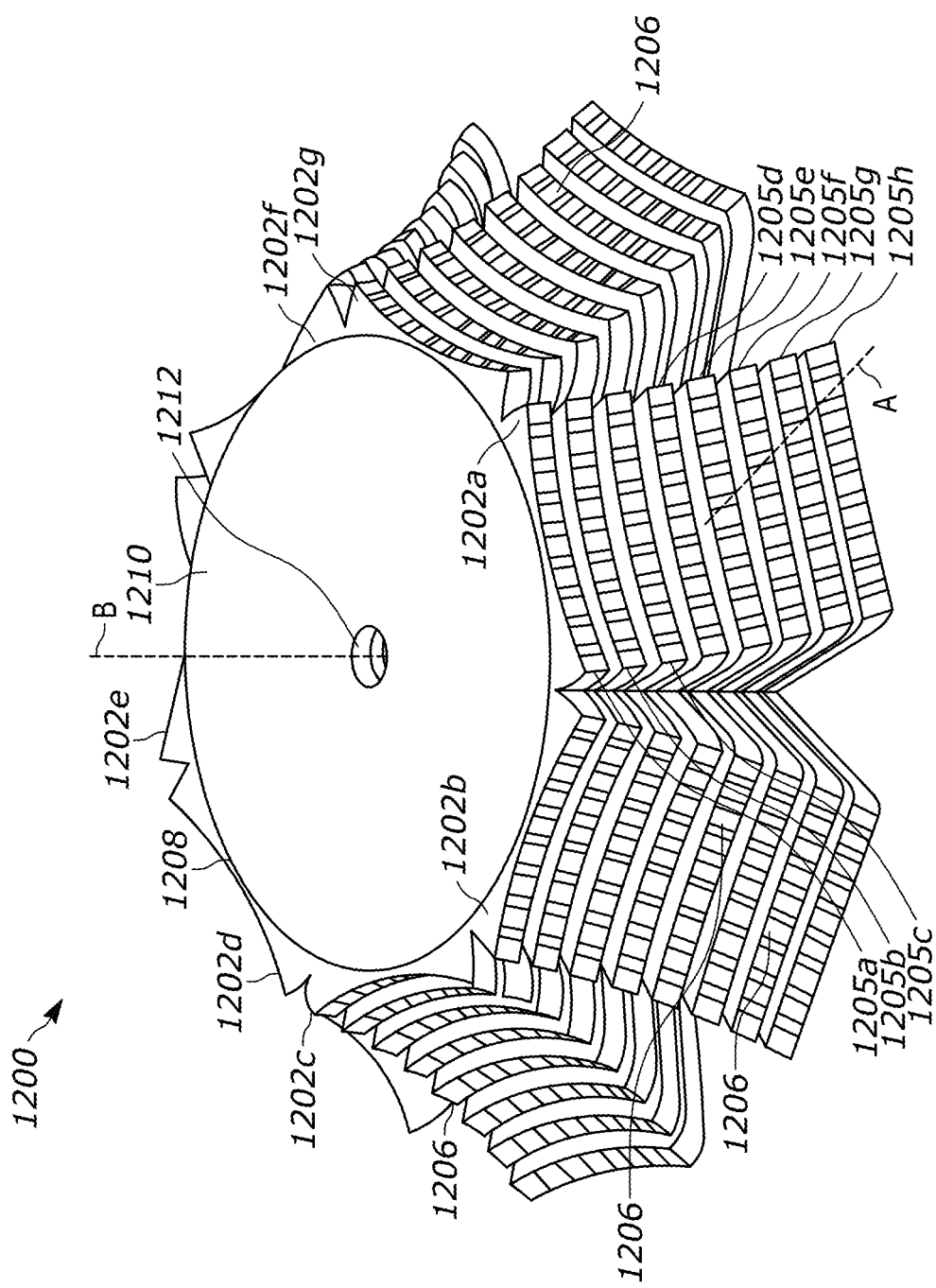
FIG. 12 is a modifiable diffractive element that allows for tuning of spectroscopy measurements for a spectrometer.

FIG. 12 is a modifiable diffractive element 1200 that allows for easy tuning of the spectrometer for spectroscopy measurements, such as the spectrometer 202 of FIG. 2A. The modifiable diffractive element 1200 has a plurality of diffractive element mounts 1202a-1202g disposed adjacent to each other around a perimeter 1208. Each of the diffractive element mounts 1202a-1202g includes an array of crystal position mounts 1206 disposed in rows of crystal position mounts 1205a-1205h, as described previously herein. Each of the crystal position mounts 1206 is configured to support the position and angular orientation of a crystal to diffract radiation when a corresponding diffractive element mount 102a-102g is disposed along an optical axis A, as described according to the geometries and optical axis A of FIGS. 2A and 2B. The diffractive element mounts 102a-102g are considered to be in an active position when disposed along the optical axis A, and in an inactive position when not disposed along the optical axis A.

Each of the diffractive element mounts 1202a-1202f is physically coupled to a central mount 1210. As illustrated, the central mount 1210 is a disk with each of the diffractive element mounts 1202a-1202f physically coupled to the perimeter 1208 of the disk. The central mount may be a cylinder, a cube, a rectangle, a square disk, a triangular cylinder, or another physical structure having surfaces for physically coupling the diffractive element mounts 1202a-1202f to. The central mount 1210 may include any number of pins, screws, screw holes, nuts, bolts, clips, or other coupling mechanisms for mounting the diffractive element mounts 1202a-1202f. Additionally, each of the diffractive element mounts 1202a-1202f may individually be decoupled from the central mount 1210 and replaced with another diffractive element mount 1202a-1202f.

The central mount 1210 has a central hole 1212 centered on an axis of rotation B. A mounting bar may be positioned through the central hole 1212 to mount the central mount 1210 to the mounting bar. The mounting bar may then rotate the diffractive element mounts 1202a-1202f around the axis of rotation B to move the diffractive element mounts 1202a-1202f into, and out of, alignment with the optical axis A (i.e., into and out of an active position for diffracting radiation).

In implementations, each of the diffractive element mounts 1202a-1202f moves its entire respective array of crystal position mounts 1206 around the central hole 1212. In other implementations, each row of the crystal position mounts 1205a-1205g is independently revolvable around the axis of rotation B. In such embodiments, each row of crystal position mounts 1205a-1025g is physically decoupled from other rows of crystal mounts for a given diffractive element mount. Each row of crystal position mounts 1205a-1205g may be coupled to a corresponding central mount 1210 that is rotatable about the axis of rotation B. As such, each row may be independently rotated about the axis of rotation to position different rows of crystals relative to the optical axis A for performing spectroscopy measurements. As such, a single row of crystals of a diffractive element mount may be changed independently of the rest of the rows for a given diffractive element mount for moving the crystals into, and out of, an active position relative to the optical axis A. The rotating of the central mount 1210, or revolving of the independent rows of crystal position mounts 1205a-1205h may be performed manually by a person, or may be controlled automatically by a computer and mechanical components such as motors, actuators, etc. The modifiable diffractive element 1200 provides one way for easily switching rows and/or arrays of crystals into and out of a diffractive element mount for performing spectroscopy measurements which reduces the amount of time, work, and personnel required for changing a spectrometer for performing different spectrometry measurements.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A two-dimensional (2D) diffractive element mount comprising: a crystal holder having a plurality of rows of crystal position mounts, each row of crystal position mounts having a plurality of crystal mounts, wherein, when the two-dimensional diffractive element mount is disposed along an optical axis, each crystal mount has a position and orientation relative to the optical axis that supports a crystal therein at a fixed position and fixed orientation relative to the optical axis.

2. The multiply diffractive element of aspect 1, wherein the position of each crystal is at a same distance from a sample, and the angular orientation of each crystal results in a same Bragg angle for radiation incident on each crystal, the radiation received from the sample.

3. The multiply diffractive element of either aspect 1 or aspect 2, wherein each of the plurality of crystals comprises a crystal having a flat surface, with each of the flat surfaces disposed to receive radiation thereon.

4. The multiply diffractive element of any of aspects 1 to 3, wherein either (i) each row of crystals comprises a same material, or (ii) each column of crystals comprises a same material.

5. The multiply diffractive element of any of aspects 1 to 4, wherein each crystal comprises at least one of germanium, silicon, lithium niobate, sapphire, quartz, or a first row transition metal.

6. The multiply diffractive element of any of aspects 1 to 5, wherein the crystal position mounts comprise a vacuum grease or a temporary adhesive disposed in the crystal position mounts that physically couples each crystal to a corresponding crystal position mount, and wherein each crystal is selectively removable from the crystal holder.

7. A selectively configurable diffractive element mount, comprising, a plurality of 2D diffractive element mounts of any of aspects 1 to 6, wherein each 2D diffractive element mount is disposed along a circumference of a circle having a central axis of rotation, and wherein each of the 2D diffractive element mounts are revolvable around the central axis of rotation such that each 2D diffractive element mount may be revolved (i) into a position along an optical axis, and (ii) out of the optical axis.

8. A selectively configurable diffractive element mount, comprising, a plurality of 2D diffractive element mounts of any of aspects 1 to 7, wherein each 2D diffractive element mount is disposed along a circumference of a circle around a central axis of rotation, and wherein each row of crystal position mounts is revolvable around the central axis of rotation such that each row of crystal position mounts may be revolved (i) into a position relative to an optical axis to support a crystal therein at a fixed position and fixed orientation relative to the optical axis, and (ii) out of the optical axis.

9. A spectrometer comprising: a multiply diffractive element of any of aspects 1 to 8 disposed along an optical axis to receive radiation from a sample; and a detector disposed to receive the radiation from the multiply diffractive element.

10. The spectrometer of aspect 9, further comprising a radiation source configured to provide radiation to a sample, wherein the sample is disposed along an optical axis to receive the radiation from the radiation source.

11. The spectrometer of either aspect 9 or aspect 10, wherein the detector comprises a two-dimensional position sensitive detector.

12. The spectrometer of aspect 11, wherein each crystal of the plurality of crystals is configured to reflect radiation onto mutually exclusive areas of the two-dimensional position sensitive detector.

13. A method for performing spectrometry, the method comprising: providing radiation to a sample disposed along a propagation axis of the radiation; receiving, from the sample, the radiation at a multiply diffractive element, the multiply diffractive element having a plurality of rows and columns of crystals disposed to receive the radiation; diffracting, by the crystals, the radiation toward a detector; and receiving, at the detector, the radiation from the crystals.

14. The method of aspect 13, wherein the position of each crystal is at a same distance from a sample, and the angular orientation of each crystal results in a same Bragg angle for the radiation.

15. The method of either aspect 13 or 14, wherein each of the crystals comprises a crystal having a flat surface disposed to receive radiation thereon.

16. The method of any of aspects 13 to 15, wherein the detector comprises a two-dimensional position sensitive detector.

17. The method of aspect 16, wherein each crystal is configured to diffract the radiation onto a mutually exclusive area of the two-dimensional position sensitive detector.

18. The method of any of aspects 13 to 17, wherein the radiation source is an x-ray radiation source.

19. The method of any of aspects 13 to 18, wherein each of the crystals comprises at least one of germanium, silicon, lithium niobate, sapphire, quartz, or a first row transition metal.

20. The method of any of aspects 13 to 19, wherein either (i) each row of crystals comprises a same material, or (ii) each column of crystals comprises a same material.

21. The method of any of aspects 13 to 20, wherein the multiply diffractive element further comprises a crystal holder having a plurality of crystal mounts for maintaining a position and angular orientation of each of the crystals.

What is claimed is:

1. A two-dimensional (2D) diffractive element mount comprising:
a crystal holder having a plurality of rows of crystal position mounts, each row of crystal position mounts having a plurality of crystal mounts, wherein, when the two-dimensional diffractive element mount is disposed along an optical axis, each crystal mount has a position and orientation relative to the optical axis configured to support a crystal therein at a fixed position and fixed orientation relative to the optical axis, such that each of said crystals would be at a same distance from a sample, and the angular orientation of each of said crystals results in a same Bragg angle for radiation, received from the sample, incident on each crystal.

2. The diffractive element mount of claim 1, further comprising a plurality of crystals each disposed in a respective one of the plurality of crystal mounts, wherein each of the plurality of crystals comprises a crystal having a flat surface, with the flat surfaces disposed to receive radiation thereon.

3. The diffractive element mount of claim 1, further comprising a plurality of crystals each disposed in a respective one of the plurality of crystal mounts, wherein either (i) each row of crystals comprises a same material, or (ii) each column of crystals comprises a same material.

4. The diffractive element mount of claim 1, further comprising a plurality of crystals each disposed in a respective one of the plurality of crystal mounts, wherein each crystal comprises at least one of germanium, silicon, lithium niobate, sapphire, quartz, or a first row transition metal.

5. The diffractive element mount of claim 1, further comprising a plurality of crystals each disposed in a respective one of the plurality of crystal mounts, wherein the crystal position mounts comprise a vacuum grease or a temporary adhesive disposed in the crystal position mounts that physically couples each crystal to a corresponding crystal position mount, and wherein each crystal is selectively removable from the crystal holder.

6. A selectively configurable diffractive element mount, comprising,
a plurality of 2D diffractive element mounts of claim 1, wherein each 2D diffractive element mount is disposed along a circumference of a circle having a central axis of rotation, and wherein each of the 2D diffractive element mounts are revolvable around the central axis of rotation such that each 2D diffractive element mount may be revolved (i) into an active position along an optical axis, and (ii) out of the active position, wherein the active position is a position in which the crystal position mounts of a 2D diffractive element mount are positioned to receive radiation thereon.

7. A selectively configurable diffractive element mount, comprising,
a plurality of 2D diffractive element mounts of claim 1, wherein each 2D diffractive element mount is disposed along a circumference of a circle around a central axis of rotation, and wherein each row of crystal position mounts is revolvable around the central axis of rotation such that each row of crystal position mounts may be revolved (i) into an active position relative to an optical axis to support a crystal therein at a fixed position and fixed orientation relative to the optical axis, and (ii) out of the active position, wherein the active position is a position in which the crystal position mounts of a row of a 2D diffractive element mount are positioned to receive radiation thereon.

8. A spectrometer comprising:
the diffractive element mount of claim 1 disposed along an optical axis to receive radiation from a sample; and
a detector disposed to receive the radiation from the multiply diffractive element.

9. The spectrometer of claim 8, further comprising a radiation source configured to provide radiation to a sample, wherein the sample is disposed along an optical axis to receive the radiation from the radiation source.

10. The spectrometer of claim 8, wherein the detector comprises a two-dimensional position sensitive detector.

11. The spectrometer of claim 10, the diffractive element mount further comprising a plurality of crystals each disposed in a respective one of the plurality of crystal mounts, wherein each crystal of the plurality of crystals is configured to reflect radiation onto mutually exclusive areas of the two-dimensional position sensitive detector.

12. A method for performing spectrometry, the method comprising:

providing radiation to a sample disposed along a propagation axis of the radiation;

receiving, from the sample, the radiation at a multiply diffractive element, the multiply diffractive element having a plurality of rows of crystals disposed to receive the radiation, wherein the position of each crystal is at a same distance from the sample, and the angular orientation of each crystal results in a same Bragg angle for the radiation;

diffracting, by the crystals, the radiation toward a detector; and receiving, at the detector, the radiation from the crystals.

13. The method of claim 12, wherein each of the crystals comprises a crystal having a flat surface disposed to receive radiation thereon.

14. The method of claim 12, wherein each crystal is configured to diffract the radiation onto a mutually exclusive area of the detector.

15. The method of claim 12, wherein the radiation source is an x-ray radiation source.

16. The method of claim 12, wherein each of the crystals comprises at least one of germanium, silicon, lithium niobate, sapphire, quartz, or a first row transition metal.

17. The method of claim 12, wherein either (i) each row of crystals comprises a same material, or (ii) each column of crystals comprises a same material.

18. The method of claim 12, wherein the multiply diffractive element further comprises a crystal holder having a plurality of crystal mounts for maintaining a position and angular orientation of each of the crystals.

* * * * *